United States Patent [19]
Bracco et al.

[11] Patent Number: 5,802,215
[45] Date of Patent: Sep. 1, 1998

[54] QUADRANT-BASED DENSITY DETECTION FOR LEAD EDGE LIGHTENING

[75] Inventors: Rosario A. Bracco, Webster; George L. Harer, Walworth; Sue K. Lam, Rochester; Louis D. Mailloux, Webster, all of N.Y.; Hoan N. Nguyen, Fountain Valley, Calif.; Cheryl A. Pence, Buena Park, Calif.; Hung M. Pham, San Gabriel, Calif.; Cathleen J. Raker, Rochester, N.Y.; Farhad D. Rostamian, Los Angeles, Calif.; Robert R. Thompson, Jr., Harbor City, Calif.; Daniel D. Truong, Hawthorne, Calif.

[73] Assignee: Xerox Corporation, Stamford, Conn.

[21] Appl. No.: 767,893

[22] Filed: Dec. 17, 1996

[51] Int. Cl.⁶ .......................... G06K 9/44; G03G 15/00; G03G 21/00; H04N 1/387
[52] U.S. Cl. .......................... 382/258; 358/452; 358/300; 399/187
[58] Field of Search .......................... 382/258; 358/401, 358/452, 300, 296, 453; 399/187, 188, 189, 190, 191, 335

[56] References Cited

U.S. PATENT DOCUMENTS

| | | | |
|---|---|---|---|
| 3,834,807 | 9/1974 | Fuller et al. | 399/189 |
| 4,743,947 | 5/1988 | Yamamoto | 399/188 |
| 4,945,386 | 7/1990 | Ito et al. | 399/187 |
| 4,972,209 | 11/1990 | Tanigawa | 358/296 |
| 5,200,837 | 4/1993 | Sakurai | 358/401 |
| 5,333,039 | 7/1994 | Sagara | 399/188 |

*Primary Examiner*—Scott Rogers
*Attorney, Agent, or Firm*—Robert Cunha

[57] ABSTRACT

A lead edge lightening circuit which will lighten a scan line based on a seven by seven pixel area surrounding the current pixel. The area is divided into four sub-areas, each of four by four pixels, and each having the current pixel at one corner. Each sub-area is summed and compared to a threshold number. If the threshold number is equalled or exceeded by at least one of the four sums, an overlay bit, which can be white or black, is output. The current pixel is replaced by a white pixel if a white pixel has been output, otherwise the current pixel remains unchanged.

4 Claims, 4 Drawing Sheets

TOP OF PAGE BEFORE

QUADRANT-BASED DENSITY DETECTION FOR LEAD EDGE LIGHTENING

BACKGROUND OF THE INVENTION

In a xerographic printing system, a circuit for lightening the density of the toner image on the leading edge of a page to be printed, to prevent paper jams and extend fuser roll life, which examines a 7×7 pixel area to detect if the current black pixel should be replaced with a white pixel.

This discussion assumes that the fast scan direction is parallel to the leading edge of the page as it travels through the paper path of a xerographic printer. It has been determined that fuser roll life will be shortened by printing pages having heavy layers of toner at the leading edge. This effect has been minimized in the past by examining the pixels in each scan at the leading edge and limiting the number of consecutive black pixels, but this process produces irregular results since some replacements that are made by this method would be found to be unnecessary, or counterproductive, if the previous and next scans were taken into account. For example, a pixel in a scan may, or may not, need to be replaced depending on whether the adjacent pixels in the previous and next scan are taken into account.

Full page lightening can also be used in a toner saver mode, where the threshold is evenly applied to the entire page. Here again, the adjacent pixels should be taken into consideration.

Therefore, a systematic method of pixel replacement that includes an analysis of the surrounding image area, yet one that does not limit the printing speed of the printer, is needed.

SUMMARY OF THE INVENTION

In the embodiment described herein, the entire seven pixel by seven pixel area surrounding each black current pixel is analyzed to decide whether it should be replaced. First, the area is divided into four overlapping quadrants or sub-areas, each containing the central pixel at one corner, and in each sub-area the pixels are summed, giving sums of from 0 to 16. If any of these sums is equal to or greater than a threshold, and the associated overlay pixel is white, then the central pixel is replaced with a white pixel. The quadrant based nature of the algorithm ensures that corners and edges are lightened in the same manner as solid areas, for a consistent overlay pattern.

In leading edge lightening, the scan lines closest to the edge are lightened the most, and lines further from the edge are lightened the least. In this embodiment, lead edge lightening is applied to the first six millimeters from the leading edge. This effect is achieved by supplying a number of overlay patterns of varying densities. For example, for a completely black scan line, an overlay pattern adjacent the edge may be 10101010 ... while the pattern away from the edge may be 11101111 ... In this way, the scans nearest the edge are lightened the most.

Finally, printing speed is not affected since the computations are done in real time and are pipelined, and the cost of additional circuitry is minimized since a seven by seven pixel window is already designed into this printer for image enhancement.

DETAILED DESCRIPTION OF THE INVENTION

Figures 1, 2:
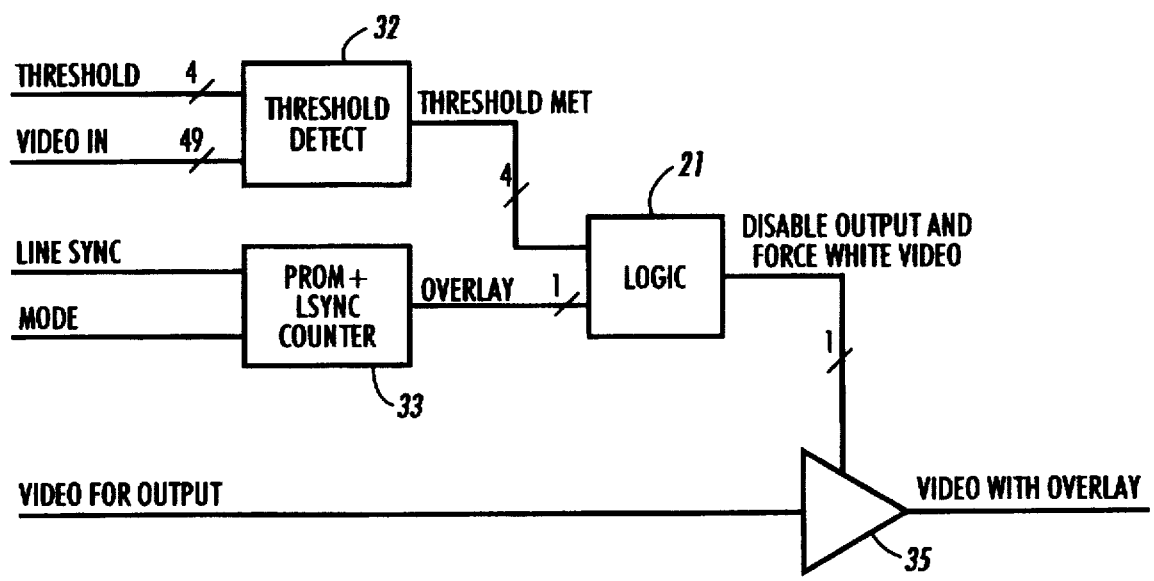
FIG. 1 is an input matrix.
FIG. 2 is a simplified block diagram of the circuit.

In FIG. 1, there is shown a seven by seven pixel area surrounding the current pixel, D4. This area is divided up into four square sub-areas, the first from A1 to D4, the second from A4 to D7, the third from D1 to G4 and the last from D4 to G7. All contain the current pixel D4. All the binary pixels, where black is 1 and white is 0, in each sub-area are summed, resulting in four numbers from 0 to 16. If any one of these numbers is equal to or greater than a threshold, then the overlay pattern is applied.

The overlay patterns, which are stored in a PROM, ROM or RAM, are eight pixel patterns which repeat over a scan line. If a threshold is reached for the current pixel, a bit is read from the PROM pattern. It the overlay bit is a zero, the current pixel is forced to white, if the overlay bit is black, the current pixel is allowed to pass as it is.

It would be commonly true that this seven by seven pixel matrix is provided in the system for image enhancement, and the same matrix can be used for this lightening as well, thus holding down the hardware incremental cost for adding this overlay feature. In the enhancement mode, the 7×7 window is used to convert the current pixel into a number of sub pixels, for example, into four sub-pixels per clock cycle instead of one pixel per clock cycle. This enhanced video would be the "video for output" of FIG. 2. At the same time, the same seven by seven pixel window is used to determine whether the final "video with overlay" will be the enhanced video or the single white overlay pixel.

FIG. 2 is a simplified block diagram of the circuit for one pixel. During a start-up mode the threshold value is loaded into the threshold detector 32 and the PROM 33 is loaded with the overlay patterns.

During operation, the 49 pixels in the seven by seven pixel area is partitioned into four sub-areas , and each is summed and compared to the threshold in the threshold detector 32, the result being four output bits. In logic 21, if any of the four sums matches the threshold, the overlay bit is output. Finally gate 35 outputs a white pixel if the overlay pixel is white, or the video bit if the overlay pixel is not white.

Figure 3:
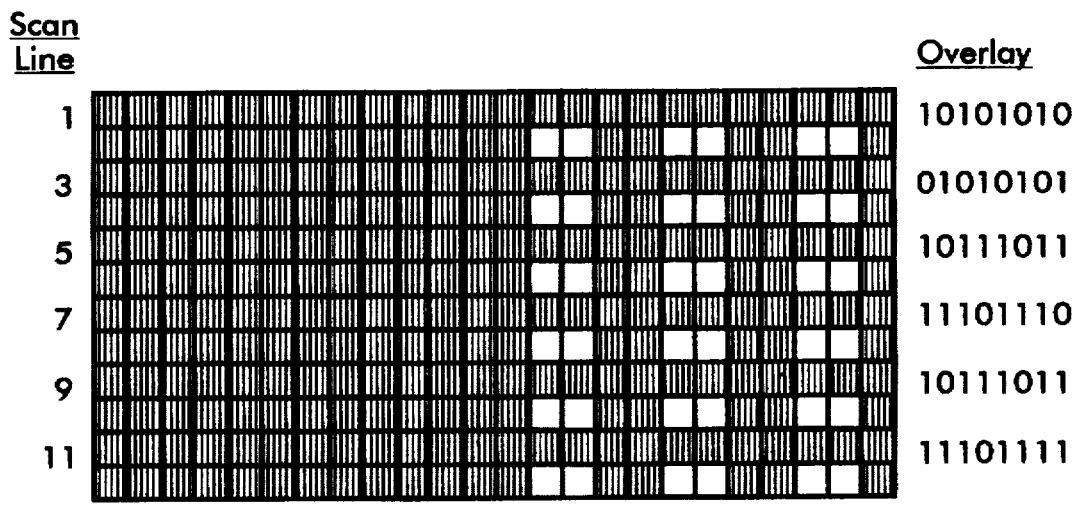
FIG. 3 shows an area of an edge before lightening.
Figure 4:
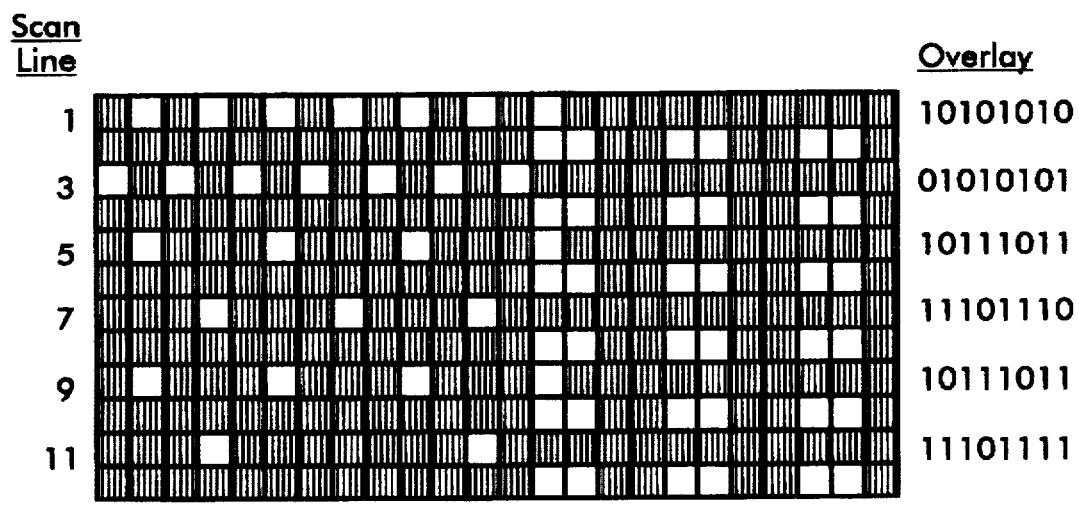
FIG. 4 shows the same area after lightening.

The overlay pattern may be different for each scan line, the first several lines are a heavier overlay (contain more zeros) than the last several, to fade out the effect as the scan recedes from the edge of the page. This is shown in FIG. 3 where the overlay for the first line is 10101010 while the last is 11101111. In this case the threshold is 13 and in this embodiment, the overlay is applied to every other line. FIG. 4 shows the effect of the lightening. Note that it was applied more heavily to the left half of the image since the right half was originally light enough so that few sub-areas reached the threshold.

Figure 6:
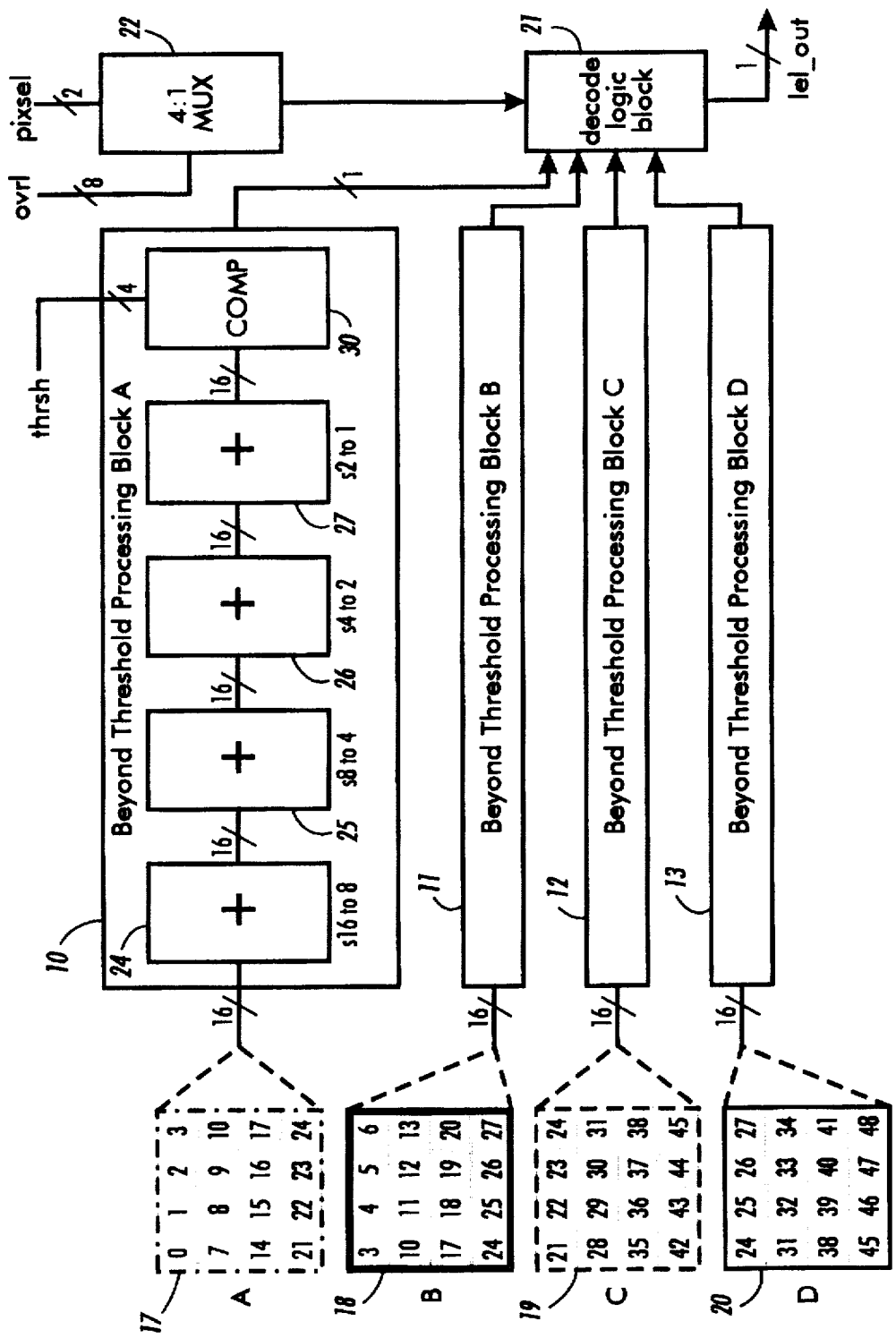
FIG. 6 is a more detailed block diagram of the circuit.

The threshold detector 32 of FIG. 2 is shown in more detail in FIG. 6. In the actual circuit, for purposes of speed, four pixels are processed in four parallel channels, and in each channel, four summations are required, one for each sub-area. Thus, the four summation blocks 10, 11, 12 and 13 are parts of one channel.

Figure 5:
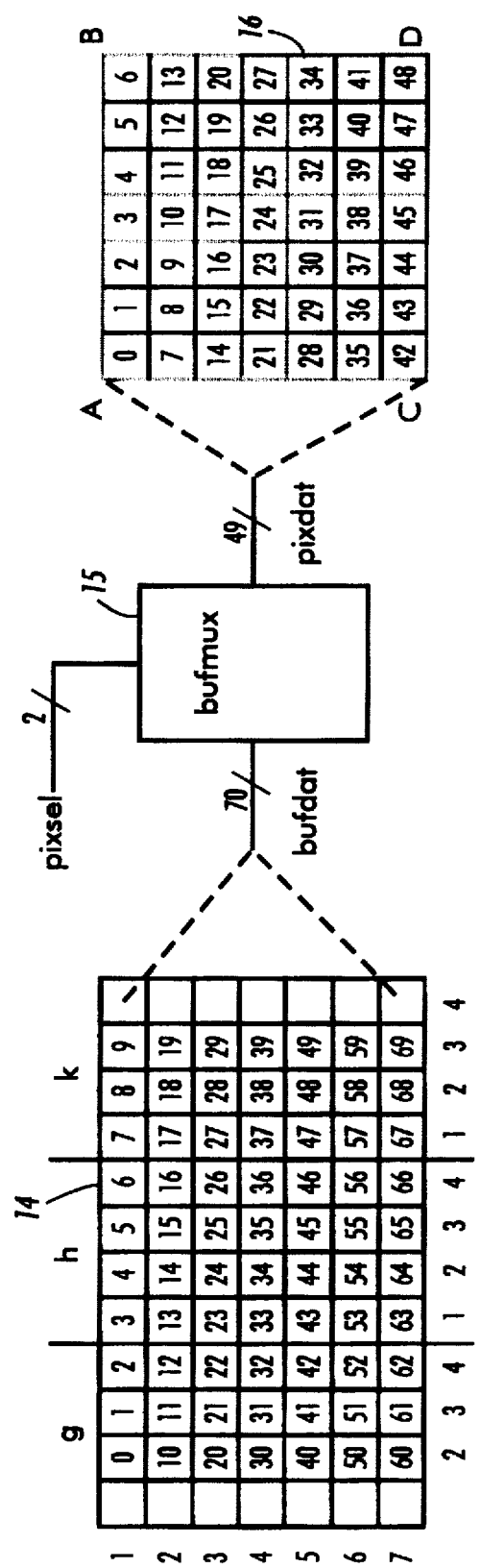
FIG. 5 shows the construction of a seven by seven pixel window.

In FIG. 5 the four pixels that are to be processed in parallel are described as pixels 33, 34, 35 and 36. Each is at the center of a seven by seven pixel area. Thus, a total of 70 pixels in a scan buffer 14 are required to be available for this processing. Under control of the two bit pixel control signal, 7×7 pixel areas are loaded through a buffer multiplexer 15 into four data buffers, one of which is shown as data buffer 16. The pixels have been renumbered in this buffer, showing pixel 24 as the current pixel.

From here, the pixels in 4×4 pixel sub-areas 17, 18, 19 and 20 of FIG. 6 are separated as shown and summed in four summers 10, 11, 12 and 13. The circuit is pipelined, resulting in four adder stages in the summer. Sixteen lines are used to carry the sixteen bits into the first stage 24 which adds each pair of bits (0+1, 2+3, etc.) resulting in an output of eight 2-bit numbers, requiring 16 lines, as shown at the output side of stage 24. The next stage 25 adds pairs to generate four 3-bit numbers, the next stage 26 generates two 4-bit numbers and the last stage 27 generates the final 5-bit number, with a range of 0-16. This number is compared to the threshold value at comparator 30 and a binary bit is output if the threshold is matched or exceeded. These four bits are presented to the logic 21.

At the same time, the eight overlay bits for this scan line are presented to 4:1 mux 22 which selects two overlay bits, under control of the 2-bit pixel signal, to present to the logic 21. One of these is selected, and output if any one of the four comparator outputs is true.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A circuit for generating lead edge lightening for a number of scan lines of pixels comprising:

an m×n bit buffer containing binary numbers describing an m by n area of pixels, where m and n are odd numbers greater than 1, and the current pixel is the center pixel, an adder for summing the bits of each sub-area within the area to create four sums, where the four sub-areas are created by dividing said area into four rectangular sub-areas, each containing a pixel located at one corner of the area and the current pixel, logic means responsive to an overlay bit, which may be in one state or another, for outputting the overlay bit if any of the four sums equals or exceeds a predetermined threshold number, and means for outputting a white bit if the overlay bit is output by the logic means and if the overlay bit is in one state, or otherwise outputting the current pixel.

2. The circuit of claim 1 further comprising means for supplying to said logic means a plurality of sequences of overlay bits, so that different scan lines will have a different sequence of overlay bits.

3. A method for generating lead edge lightening for a number of scan lines of pixels comprising the steps of:

defining an m by n area of pixels, where m and n are odd numbers greater than 1, and the current pixel is the center pixel, summing the bits of each sub-area within the area to create four sums, where the four sub-areas are created by dividing said area into four rectangular sub-areas, each containing a pixel located at one corner of the area and the current pixel, outputting an overlay bit if any of the four sums equals or exceeds a predetermined threshold number, and outputting a white bit if the overlay bit is output by the logic means and if the overlay bit is in one state, or otherwise outputting the current pixel.

4. The method of claim 3 further comprising supplying to said logic means a plurality of sequences of overlay bits, so that different scan lines will have a different sequence of overlay bits.

* * * * *